Nov. 23, 1926.  1,608,431
C. B. ROWLAND
NONSKID DEVICE
Filed April 4, 1925  3 Sheets-Sheet 1
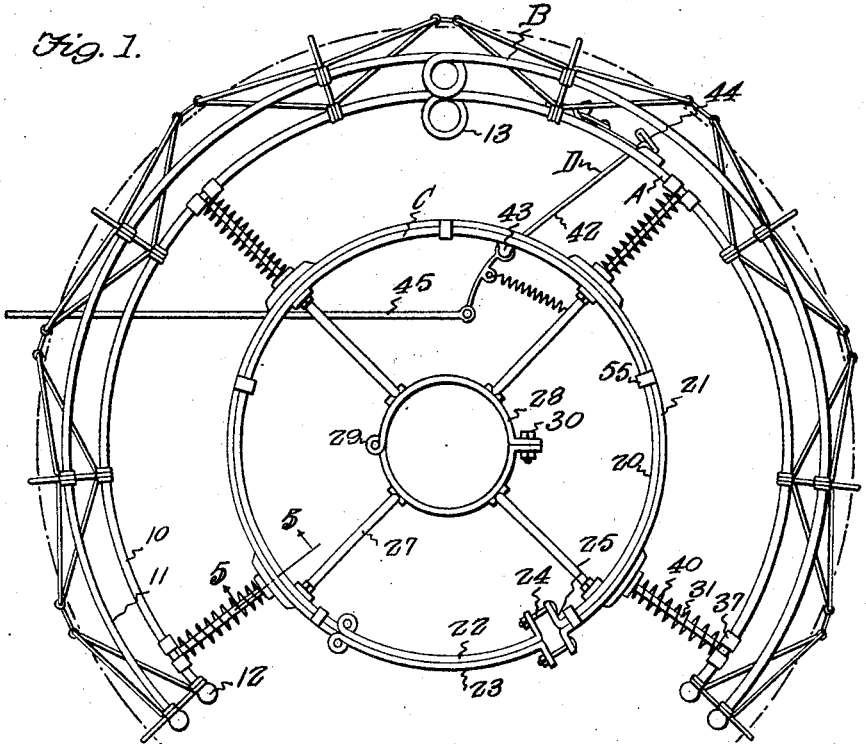
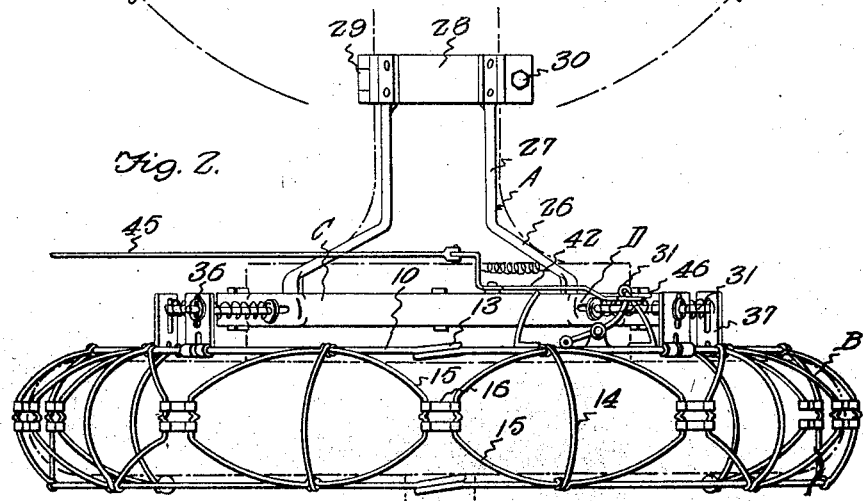
Clifford B. Rowland, Inventor

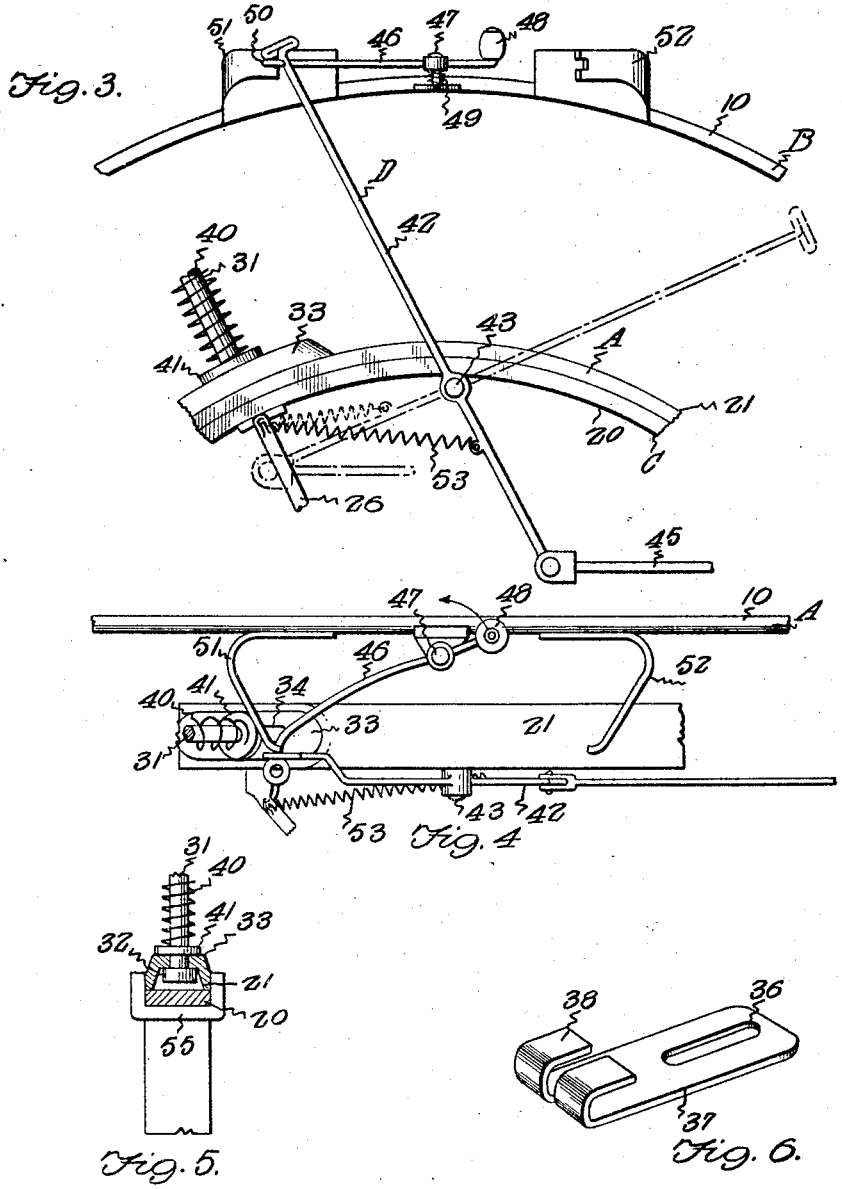

Nov. 23, 1926.  
C. B. ROWLAND  
NONSKID DEVICE  
Filed April 4, 1925  
1,608,431  
3 Sheets-Sheet 3

Clifford B. Rowland, Inventor

Witnesses

By Richard B. Owen, Attorney

Patented Nov. 23, 1926.

1,608,431

UNITED STATES PATENT OFFICE.

CLIFFORD BEEBE ROWLAND, OF TRENTON, NEW JERSEY.

NONSKID DEVICE.

Application filed April 4, 1925. Serial No. 20,755.

This invention appertains to a novel attachment for vehicles and more particularly to a non-skid attachment for automobiles.

The primary object of the present invention is the provision of a non-skid device for the wheels of automobiles which will be normally inactive and which can be easily and quickly placed in operation whenever necessary or desirable.

Another object of the invention is the provision of a non-skid attachment for automobile wheels arranged to normally rotatably receive the wheel and held against rotation relative thereto, means being provided operated from the dashboard for permitting the connection of said non-skid members with the wheels for rotation therewith to prevent the skidding of the vehicle on a wet or muddy roadway.

Another object of the invention is the provision of novel means for mounting the non-skid elements in place and novel means for normally holding the elements against rotation.

A still further object of the invention is to provide an improved non-skid attachment for automobiles of the above character, which will be durable and efficient in use, one that will be simple and easy to manufacture, and one that can be incorporated with a conventional automobile at a small cost.

Figure 7:
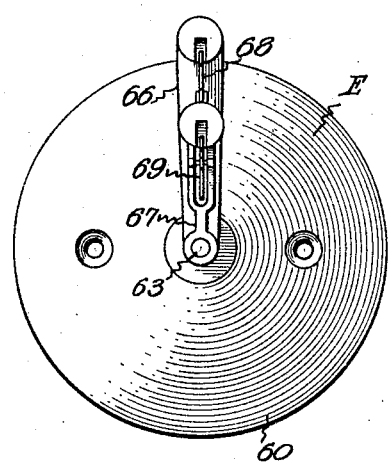
Figure 8:
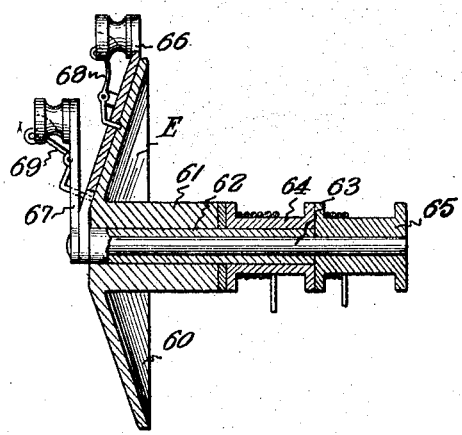
Figure 9:
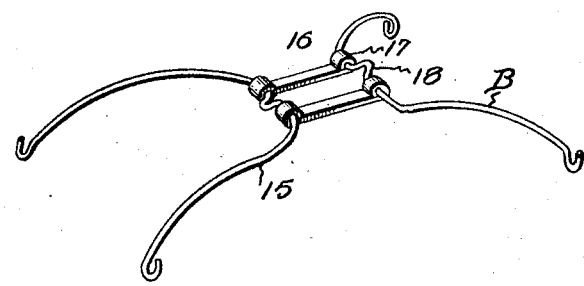
Figure 10:
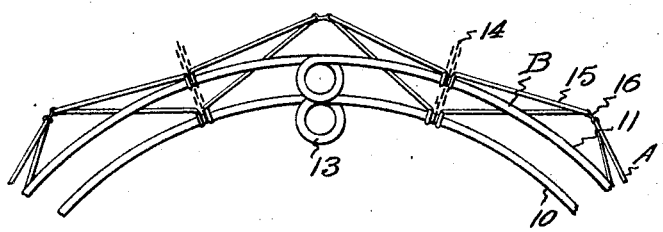

With these and other objects, the invention consists in the novel construction, arrangement and formation of parts, as will be hereinafter more specifically described and claimed and illustrated in the accompanying drawings, in which drawings:

Figure 1 is an inner side elevation of one of the improved anti-skidding devices, Figure 2 is a top plan view thereof, Figure 3 is an enlarged detail view showing the outer side of one of the anti-skid elements and illustrating the novel trip and cam lever for releasing the anti-skidding elements and for locking the same with a tire, Figure 4 is a fragmentary top plan view of the parts illustrated in Figure 3, Figure 5 is a detail section taken on the line 5—5 of Figure 1 looking in the direction of the arrows, Figure 6 is a detail perspective view of one of the rod supporting lugs for the antiskid elements, Figure 7 is a front elevation of the operating mechanism for fitting the anti-skidding elements in operation, Figure 8 is a longitudinal section through the same, Figure 9 is a detail perspective view of a portion of the anti-skid elements illustrating the novel means of pivotally connecting the anti-skid gripping members of the anti-skid elements together, and Figure 10 is an enlarged side elevation of said anti-skid elements.

Referring to the drawings in detail, wherein similar reference characters designate corresponding parts throughout the several views, the letter A generally indicates the improved anti-skid attachment as a whole and the same embodies an anti-skidding element B, which is adapted to encircle a tire in such a manner as to permit the free rotation of a wheel within the same, C the novel support therefor; D the means for holding the anti-skidding element against rotation with the tire and E the means for operating said releasing means.

The anti-skidding element B is of an arcuate shape in side elevation and of an arc slightly less than a circle, so as to permit a wheel to revolve therein and to engage the ground. This anti-skid element includes inner and outer bands 10 and 11 arranged in spaced relation. These bands 10 and 11 terminate in knobs 12 and the ends of the bands are spaced as can be readily seen by referring to Figure 1 of the drawings. It is also preferred to construct the bands of resilient material and the same are provided at a point equi-distant their ends with resilient loops 13. These bands 10 and 11 are connected together by cross or transverse wires or anti-skid chains 14, which are of a flexible nature. The wires 14 have their terminals coiled about the bands. Arranged intermediate the transverse anti-skid wires 14 are U-shaped loops 15 which have their bight portions extending inwardly toward each other. The terminals of the legs of said U-shaped members are coiled about the bands 10 and 11. The bight portions of the adjacent U-shaped loops 15 are connected together for swinging movement relative to one another and as clearly shown in Figure 9 of the drawings the said loops are connected together by short wear straps 16 having hinge barrels 17 formed on their terminals which rockably receive said U- shaped anti-skid loops. Directly between the hinge barrels 17 and the straps 16 the bight portions of the loops 15 are provided with inwardly directed bent tongues 18 which prevent the slipping or shifting movement of the straps 16 relative to the bands 10 and 11. It is to be also noted at this point that the outer band 11 is arranged closer to the tread of the tire and in placing the device in position the band 11 is grasped and sprung outward so as to permit the springing of the entire anti-skid element over the tire.

The means C utilized for holding the anti-skid member B in place comprises a non-rotatable supporting ring 20 which is rigidly connected to the casing of the axle in a manner, which will be hereinafter more fully described. The ring 20 rotatably supports an outer ring 21 which is connected with the anti-skid member B and the novel latch means D is provided for normally preventing the rotation of the said anti-skid member B and the band 21 relative to the band 20 and the axle housing.

As clearly shown in Figure 1 the inner and outer bands 20 and 21 are provided with swinging gates 22 and 23 for permitting the association of the said rings with the axle housing. These gates 22 and 23 are held against normal swinging movement by means of bolts 24 which can be passed through laterally extending alined ears 25 formed on the terminals of the gates and the terminals of the bands. The inner band 20 has formed thereon or rigidly secured thereto the inwardly extending rods 26 which terminate in the laterally extending arms 27, which are in turn riveted or otherwise secured to the connecting hoop 28 which is adapted to encircle the axle housing. This hoop 28 is preferably formed in a pair of sections pivotally connected together as at 29 and normally held against swinging movement by the use of a bolt 30 passing through abutting ears, formed on the free ends of the said sections. By this construction, it can be seen that the band 20 can be rigidly held in place. This ring or band is adapted to be slipped over the ordinary brake drum as can be seen in Figure 2 of the drawings.

The means for connecting the rotatable ring or band 21 with the anti-skid member B comprises radially extending supporting spokes 31, the inner ends of which are provided with heads 32 slidably mounted in guideways 33 struck out from the face of said ring 21. The said guideways 33 are provided with circumferentially extending slots 34 through which the spokes can extend. The outer terminals of the spokes 31 are extended through slots 36 formed in the supporting ears 37, which are secured by means of tongues 38 to the inner band 10. The inward sliding movement of the spokes 31 through the lugs 37 can be limited by the use of suitable cotter pins or the like. Expansion springs 40 are coiled about the spokes and engage suitable washers 41 engaging the inner and outer faces. The expansion springs 40 normally hold the anti-skid member B in spaced relation to the vehicle wheel and also allow inward movement of the said anti-skid element toward the supporting ring 20 when the anti-skid element or member B is brought into use. Owing to the means of mounting the spokes 31 in position, movement of the anti-skid member is permitted relative to the said supporting band.

In order to normally hold the anti-skid member B against rotation, the novel latch means D is provided.

This latch means D embodies a swinging lock lever 42, which is rockably mounted at a point intermediate its ends on a pivot pin 43, which is secured to or formed on the supporting band 20 in any desired way. The upper end of the lever is provided with a head 44, while the lower end thereof is provided with a suitable eye, to which is connected in any desired manner a pull cable 45. The upper end of the lever 42 is disposed in the path of a cam lever 46. This cam lever 46 is rockably mounted at a point intermediate its ends on a pivot pin 47 which is formed on or carried by the inner band 10 in any desired manner. The extreme inner end of the cam lever 46 is provided with a roller 48, which is adapted to move in contact with the tire, when it is desired to lock the anti-skid member with the tire for rotation therewith. This roller is normally urged into engagement with the tire by means of a spring 49 which is coiled about said pivot pin 47. One end of the spring engages the cam lever and the other end the band 10. The outer end of the cam lever 46 is provided with a hook 50 which is adapted to be engaged by the trip lever 42. Suitable stops 51 and 52 are carried by the band 10 each side of the pivot point of the lever 46 and these stops form means for limiting the movement of said cam lever. It is obvious that when the end of the lever 46 engages the stop 51 and the said lever is held against swinging movement by the trip lever 42 that the roller 48 will be held out of engagement with the tire. When the cable 45 is loosened, it can be seen that the spring 53, which has one terminal connected to the lever 42 and the supporting ring 20 will move the trip lever from out of the path of the hooked end 50 of the cam lever 46 causing the inner end of the cam lever to be moved into engagement with the tire under the influence of the spring 49. This will result in a wedging action taking place between the tire and the cam lever which will cause the anti-skid member to rotate with the tire and thus effectively prevent the skidding of the vehicle and permitting the vehicle to obtain a firm grip upon the roadway.

In order to insure the proper rotation of the outer supporting band 21 relative to the inner supporting band or ring 22, the said outer band is provided with U-shaped guide clips 55 which engage the opposite edges of the said supporting band 20.

In order to permit the convenient operation of the cable 45 I provide means E, preferably located on dashboard of the motor vehicle, which includes the base plate 60. This base plate 60 is of a disk-shape and is provided with the inwardly extending hollow hub 61 which can be secured to the dashboard in any preferred manner. Rotatably mounted within the hollow hub 61 is a hollow shaft 62, which in turn rotatably receives the solid shaft 63. The hollow shaft 62 has keyed or otherwise secured thereto a drum 64, while a similar drum 65 is keyed to the solid shaft 63. The drum 64 receives the cable 45 for actuating the lever 42 on one side of the vehicle, while the drum 65 receives the cable 45 operating the latch lever 42 on the other side of the vehicle. This permits two anti-skid members to be brought into play simultaneously or permits either one of the members to be used independently of the other. The hollow shaft 62 and the solid shaft 63 have keyed thereto independent operating levers 66 and 67 respectively. The lever 66 of the hollow shaft is held in an adjusted position by means of a pivoted dog 68, while the lever 67 can be locked in engagement with the lever 66 by means of a pivoted dog 69.

By winding up on the shafts 62 and 63 it can be seen that the cable 45 can be held taut thus firmly holding the upper end of the said trip lever in engagement with the cam lever 46.

From the foregoing description, it can be seen that I have provided a novel anti-skidding device for automobile tires, which will be normally held in an inoperative position relative to the tires, but which can be quickly set into operation in connection therewith, when necessary or desirable.

Changes in details may be made without departing from the spirit or scope of this invention, but:—

What I claim as new is:

1. An anti-skidding attachment for automobiles comprising an anti-skid member including inner and outer spaced arcuate bands, anti-skid devices connecting the bands together, the terminals of the bands being spaced to permit the vehicle wheel to extend therethrough in engagement with the ground, a supporting band rigidly connected with the vehicle, a rotatable band mounted upon said supporting band, means slidably connecting the rotatable band with the anti-skid member, and releasable means for locking the rotatable band and the anti-skid member with the vehicle.

2. An anti-skid attachment for automobiles comprising an anti-skid member including inner and outer arcuate bands formed of resilient material having their terminals spaced to permit a wheel to extend therethrough in engagement with the ground, wear members connecting the bands together including inwardly directed U-shaped members rockably connected together, a cam lever rockably mounted at a point intermediate its end upon the bands, a roller carried by the inner end of said cam lever, stops disposed in the path of the rocking movement of the lever, a supporting band, means for clamping the band to the axle housing of the vehicle, a rotatable band mounted in front of the supporting band, means resiliently and slidably connecting the anti-skid member with the rotatable band, a trip lever rockably mounted at a point intermediate its ends upon the supporting band and a cable and drum for normally holding one end of the lever in the path of the cam lever in engagement with one of the stops, spring means normally moving the latch lever from out of the path of the cam lever upon the unwinding of the cable, and spring means normally urging the roller of the cam lever in engagement with the vehicle wheel and tire upon release of said cam lever.

3. An anti-skidding attachment for automobiles comprising an anti-skid member, a supporting band rigidly connected to the vehicle, a rotatable band mounted upon said supporting band, means slidably connecting the rotatable band with the anti-skid member, means carried by the anti-skid member for locking the rotatable band and anti-skid member to the vehicle and means carried by said supporting band and engageable with said locking means for normally holding the latter out of operative position.

4. An anti-skidding attachment for vehicles comprising an anti-skid member including inner and outer spaced arcuate bands, a supporting band rigidly connected to the vehicle, a rotatable band mounted upon said supporting band, means slidably connecting the rotatable band with the anti-skid member, means pivotally carried by one of said arcuate bands for locking the rotatable band and anti-skid member to the vehicle, and means pivotally carried by said supporting band and engageable with said locking means for normally holding the latter out of operative position.

5. An anti-skidding attachment for vehicles comprising an anti-skid member, a supporting band rigidly connected to the vehicle, a rotatable band mounted upon said supporting band, means slidably connecting the rotatable band with the anti-skid member, a lever pivotally carried by said anti-skid member and adapted to lock the same in engagement with the vehicle, and an operating lever pivotally carried by the supporting band and engageable with said first named lever for normally holding the same out of locking position.

6. An anti-skidding attachment for vehicles comprising an anti-skid member including inner and outer spaced arcuate bands, a supporting band rigidly connected with the vehicle, a rotatable band mounted upon the said supporting band, means slidably connecting the rotatable band with the said anti-skid member, a cam lever pivotally secured intermediate its ends to the inner arcuate band, and an operating lever pivotally mounted intermediate its ends to said supporting band and normally engageable with said cam lever for holding the latter out of operative position.

7. An anti-skid attachment for automobiles comprising an anti-skid member including inner and outer arcuate bands formed of resilient material having their terminals spaced to permit a wheel to extend therethrough in engagement with the ground, a cam lever rockably mounted at a point intermediate its ends upon the bands, a roller carried by the inner end of said cam lever, a supporting band, means for clamping the band to the axle housing of the vehicle, a rotatable band mounted in front of the supporting band, means resiliently and slidably connecting the anti-skid member with the rotatable band, a trip lever rockably mounted at a point intermediate its ends upon the supporting band and normally held in the path of the cam lever, and spring means for normally urging the roller of the cam lever in engagement with the vehicle wheel and tire upon release of said cam lever.

8. An anti-skid attachment for vehicles comprising an anti-skid member, means for supporting said anti-skid member upon said vehicle, a cam lever pivotally mounted intermediate its ends on said anti-skid member for normally locking said anti-skid member to the wheel of the vehicle, and a trip lever pivotally mounted intermediate its ends on said supporting means and engageable with said cam lever for normally holding the latter out of operative position.

9. An anti-skid attachment for vehicles comprising an anti-skid member, means for supporting said anti-skid member upon said vehicle, a cam lever rockably mounted at a point intermediate its ends to said anti-skid member, a roller carried by the inner end of said cam lever, a trip lever rockably mounted at a point intermediate its ends upon said supporting means and having one end thereof normally held in the path of the cam lever, and spring means whereby upon movement of the trip lever, the cam lever will be urged in engagement with the vehicle wheel and tire.

10. An anti-skidding attachment for automotive vehicles comprising an anti-skid member, a supporting band rigidly connected to the vehicle, a rotatable band mounted upon said supporting band, and means connecting the rotatable band with the anti-skid member.

11. An anti-skidding attachment for automotive vehicles comprising an anti-skid member, a supporting band rigidly connected to the vehicle, a rotatable band mounted upon said supporting band, means connecting the rotatable band with the anti-skid member and means carried by the anti-skid member for locking the rotatable band and anti-skid member to the vehicle.

12. An anti-skidding attachment for automotive vehicles comprising an anti-skid member, a supporting band rigidly connected to the vehicle, means slidably connecting the supporting band and anti-skid member, means carried by the anti-skid member for locking the same to the vehicle, and means carried by said supporting band and engageable with said locking means for normally holding the latter out of operative position.

In testimony whereof I affix my signature.

CLIFFORD BEEBE ROWLAND.